United States Patent [19]
Olevsky

[11] 3,895,597
[45] July 22, 1975

[54] WIND OPERATED AMPHIBIOUS VEHICLE
[75] Inventor: Walter Olevsky, Carlstadt, N.J. 07072
[73] Assignee: Lawrence Peska Associates, Inc., New York, N.Y.; a part interest
[22] Filed: May 8, 1974
[21] Appl. No.: 468,281

[52] U.S. Cl. ............... 115/1 R; 114/39; 180/6.2
[51] Int. Cl. ............................................. B60f 3/00
[58] Field of Search ............ 9/1 T; 114/39, 43, 102; 115/1 R; 280/79.1, 211; 180/6.2; 16/25, 26

[56] References Cited
UNITED STATES PATENTS

| 736,386 | 8/1903 | Hausen | 280/211 |
|---|---|---|---|
| 2,351,542 | 6/1944 | Paull | 114/39 |
| 2,837,342 | 6/1958 | Kirk | 280/211 |
| 3,224,032 | 12/1965 | McLean | 16/26 |
| 3,308,782 | 3/1967 | Dahl | 115/1 R |
| 3,401,421 | 9/1968 | Aninger | 16/25 |

FOREIGN PATENTS OR APPLICATIONS

| 237,187 | 7/1911 | Germany | 115/1 R |
|---|---|---|---|
| 273,566 | 7/1927 | United Kingdom | 114/39 |
| 11,345 | 5/1892 | United Kingdom | 16/25 |
| 608,229 | 9/1948 | United Kingdom | 180/6.2 |

Primary Examiner—Trygve M. Blix
Assistant Examiner—Edward R. Kazenske

[57] ABSTRACT

A wind operated amphibious vehicle large enough to support a rider has a frame, a sail and three wheels buoyant enough to support the vehicle in water. Brake and steering device acts on the two back wheels and the vehicle has sails to propel it.

6 Claims, 3 Drawing Figures

PATENTED JUL 22 1975  3,895,597
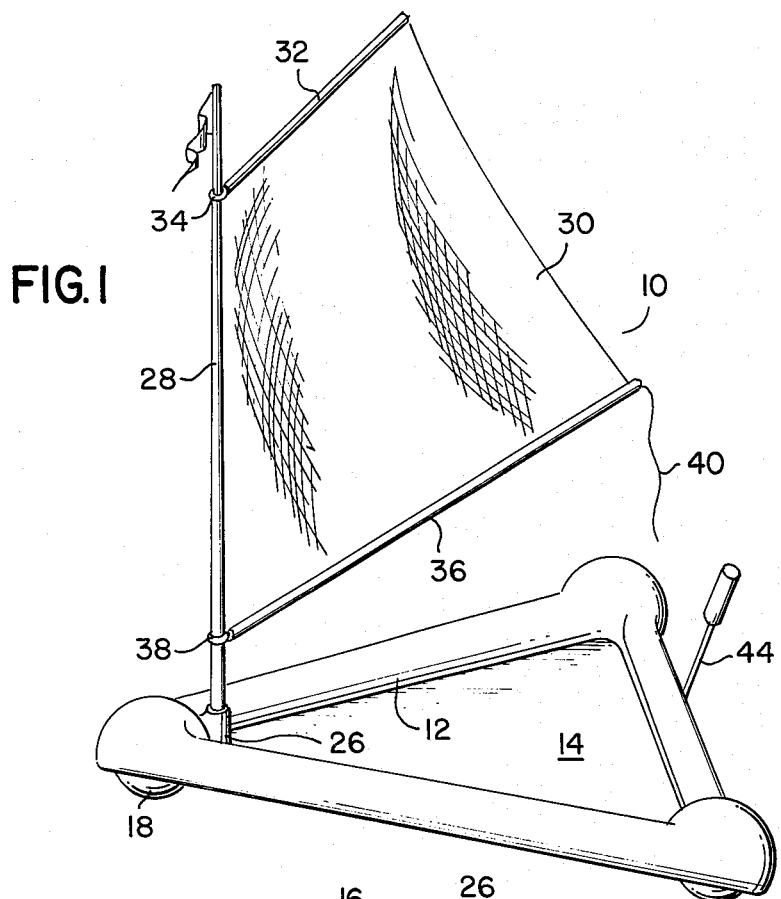
FIG.1
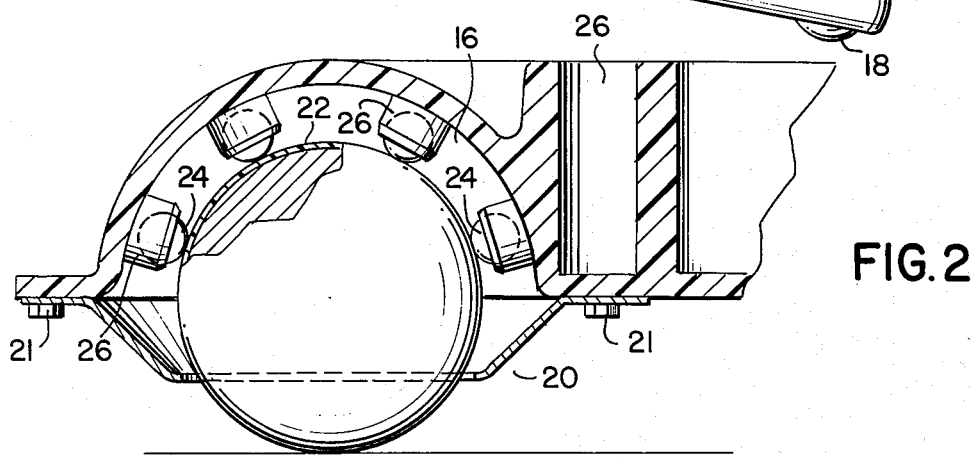
FIG.2
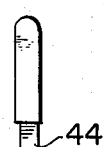
FIG.3
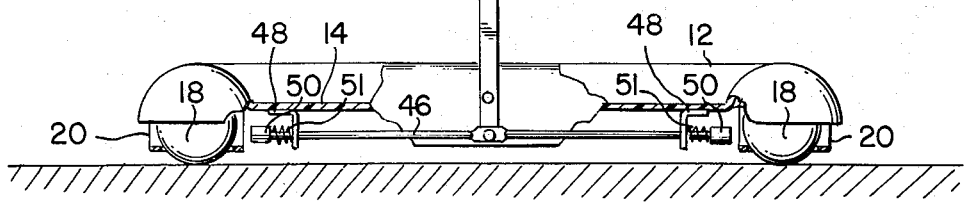

WIND OPERATED AMPHIBIOUS VEHICLE

BACKGROUND OF THE INVENTION

FIELD OF THE INVENTION

This invention relates to an amphibious vehicle of the sailboat type and more especially to a toy for carrying a child on land and water.

The vehicle of the invention is constructed of buoyant material so as to readily float.

SUMMARY OF THE INVENTION

The principal object of this invention is to provide a device or article of this character which combines simplicity, strength and durability in a high degree, together with inexpensiveness of construction.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

BRIEF DESCRIPTION OF THE DRAWINGS

In the accompanying drawing, in which is shown one of the various possible illustrative embodiments of this invention, wherein like reference character identify the same or like parts:

FIG. 1 is a perspective view of an amphibious vehicle embodying the features of this invention;

FIG. 2 is a detailed view, partly broken away to show fastening of the ball type front wheels; and FIG. 3 is a rear view of the vehicle partly broken away to show the braking means.

DETAILED DESCRIPTION

With reference to the drawing, there is shown and illustrated an amphibious vehicle constructed in accordance with the principles of the invention and designated generally by reference character 10.

The vehicle includes a three-cornered frame 12 preferably molded of light, buoyant plastic such as polyurethane, polyethylene and the like. The frame also can be made of balsa or similar low density wood. A seat 14 molded integrally with frame 12 or otherwise secured thereto supports the rider. Each corner of the frame has a rounded cavity 16 housing ball-like wheel 18 supported therein by bracket or keeper ring 20 which has a central opening through which a part of wheel 18 protrudes to contact the ground or water. Member 20 is fixed to the frame by bolts 21.

Wheels 18 are made of a buoyant, very hard plastic such as polystyrene or polycarbonate with a smooth finish to minimize friction. In the embodiment shown, ball 18 has an outer layer or cover 22 of self-lubricating plastic such as "teflon". Ball wheel 18 rides on a plurality of ball bearings 24 also of the same material as wheel 18 and held by housings 26 secured to cavity 16 and spaced thereon, as shown.

Integral with frame 12 behind its front corner is step 26 which is deep enough to hold without other means mast 28. A sail 30 which preferably is made of noncrease fabric and is gaff rigged to afford the maximum amount of sail area in a minimum space. The upper part of the sail is secured in known manner to upper spar 32 which is connected to mast 28 by ring 34 fitting around the mast. The lower part of the sail is fastened to boom 36 fitting on mast 28 by ring 38. A sheet 40 is attached to the end of boom 36.

The vehicle is steered on land as shown by FIG. 3. A roller brake assembly is mounted in the rear of the vehicle and consists of vertical handle 44 rigid with rod 46 supported in brackets 48 fastened under the frame. At each end of rod 46 are mounted brake shoes 50 of softer plastic than wheels 18 to facilitate replacement by wearing out instead of the rear wheels. Coiled springs 51 wound around rod 46 are interposed between the brake shoes and the brackets. Through lateral movement of the handle, pressure is applied to one of the rear wheels at a time thereby changing the direction of travel of the vehicle.

To stop the vehicle on land, either one of the rear wheels is braked and the sail line 40 is let go. To stop on the water, it suffices to let the sail go just like with conventional sailboats.

While the present vehicle has been described with reference to a small sized vehicle the invention is not limited thereto and the vehicle can be made in any size.

The vehicle of the invention has been thoroughly tested and found to be entirely successful for the achievement of the objects of the invention.

The operation and use of the invention hereinabove described will be evident to those skilled in the art to which it relates from a consideration of the foregoing.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention I claim as new and desire to secure by Letters Patent:

1. A wind powered, amphibious vehicle comprising a three-cornered buoyant frame, a ball-shaped buoyant front wheel rotatably connected to the front corner of said frame; a ball-shaped buoyant rear wheel rotatably connected to each respective rear corner of said frame; dirigible means, mounted on said frame between said rear corners, including a pair of brake shoes contacting one of said rear wheels at a time to steer said vehicle when on land; a mast step adjacent said front corner of said frame; a rigged mast for propelling said vehicle is held in said step; a boom connected to said rigged mast; and a sheet connected to said boom.

2. The vehicle of claim 1 including a plurality of ball bearings on the underside of said corners in contact with said wheels.

3. The vehicle of claim 1, wherein said dirigible means include a rod holding said brake shoes and a steering handle integral with said rod for bringing said brake shoes into operative contact with said rear wheels.

4. The vehicle of claim 1 wherein said sail is gaff shaped.

5. The vehicle of claim 1, wherein said wheels are of hard plastic and said brake shoes are of softer plastic.

6. The vehicle of claim 2, wherein said wheels and said bearings have an outer layer of self-lubricating plastic.

* * * * *